United States Patent
Hargreaves et al.

(10) Patent No.: US 8,415,958 B2
(45) Date of Patent: Apr. 9, 2013

(54) SINGLE LAYER CAPACITIVE IMAGE SENSING

(75) Inventors: Kirk Hargreaves, Sunnyvale, CA (US); Mihai M Bulea, Santa Clara, CA (US)

(73) Assignee: Synaptics Incorporated, Santa Clara, CA (US)

( * ) Notice: Subject to any disclaimer, the term of this patent is extended or adjusted under 35 U.S.C. 154(b) by 306 days.

(21) Appl. No.: 12/815,662

(22) Filed: Jun. 15, 2010

(65) Prior Publication Data

US 2011/0062969 A1    Mar. 17, 2011

Related U.S. Application Data

(60) Provisional application No. 61/241,692, filed on Sep. 11, 2009.

(51) Int. Cl.
G01R 27/26 (2006.01)
(52) U.S. Cl.
USPC .............................. 324/658; 324/649; 324/686
(58) Field of Classification Search .................. None
See application file for complete search history.

(56) References Cited

U.S. PATENT DOCUMENTS

| | | | |
|---|---|---|---|
| 4,087,625 A | 5/1978 | Dym et al. | |
| 5,841,078 A | 11/1998 | Miller et al. | |
| 6,288,707 B1 | 9/2001 | Philipp | |
| 6,297,811 B1 * | 10/2001 | Kent et al. | 345/173 |
| 6,879,930 B2 | 4/2005 | Sinclair et al. | |
| 7,030,860 B1 | 4/2006 | Hsu et al. | |
| 7,265,686 B2 | 9/2007 | Hurst et al. | |
| 7,382,139 B2 * | 6/2008 | Mackey | 324/660 |
| 7,737,953 B2 | 6/2010 | Mackey | |
| 2004/0135775 A1 | 7/2004 | Hurst et al. | |
| 2005/0012644 A1 | 1/2005 | Hurst et al. | |
| 2006/0038791 A1 | 2/2006 | Mackey | |
| 2006/0097991 A1 | 5/2006 | Hotelling et al. | |
| 2007/0146349 A1 | 6/2007 | Errico et al. | |
| 2007/0257894 A1 | 11/2007 | Philipp | |
| 2008/0006453 A1 | 1/2008 | Hotelling | |
| 2008/0246496 A1 | 10/2008 | Hristov et al. | |
| 2009/0194344 A1 | 8/2009 | Harley et al. | |

(Continued)

FOREIGN PATENT DOCUMENTS

EP         2045698        4/2009

OTHER PUBLICATIONS

ISA/KR, International Search Report and Written Opinion for International Application No. PCT/US2010/048319, 11 pages, Apr. 28, 2011.

*Primary Examiner* — Minh N Tang

(57) ABSTRACT

A capacitive imaging sensor device includes a sensor substrate. A first set of sensor electrodes is disposed on a first surface of the sensor substrate, substantially in parallel with a first axis, and with at least two of its sensor electrodes extending for different lengths along the first axis. A second set of sensor electrodes is disposed on the first surface, substantially in parallel with the first axis, and in a common single layer with the first set. A processing system is coupled with the first and second sets and configured for: measuring a first capacitive coupling between a first sensor electrode of the first set and a sensor electrode of the second set; measuring a second capacitive coupling between a second sensor electrode of the first set and the sensor electrode of the second set; and determining a capacitance image using the first and second measurements of capacitive coupling.

20 Claims, 10 Drawing Sheets

U.S. PATENT DOCUMENTS

| | | |
|---|---|---|
| 2009/0267914 A1 | 10/2009 | Dews et al. |
| 2009/0277696 A1 | 11/2009 | Reynolds et al. |
| 2009/0322355 A1 | 12/2009 | Day et al. |
| 2010/0007625 A1 | 1/2010 | Jiang et al. |
| 2010/0045632 A1 | 2/2010 | Yilmaz et al. |
| 2010/0164889 A1 | 7/2010 | Hristov et al. |
| 2010/0258360 A1 | 10/2010 | Yilmaz |
| 2010/0328255 A1 | 12/2010 | Ishizaki et al. |
| 2011/0043478 A1 | 2/2011 | Matsushima |
| 2011/0048813 A1 | 3/2011 | Yilmaz |

* cited by examiner

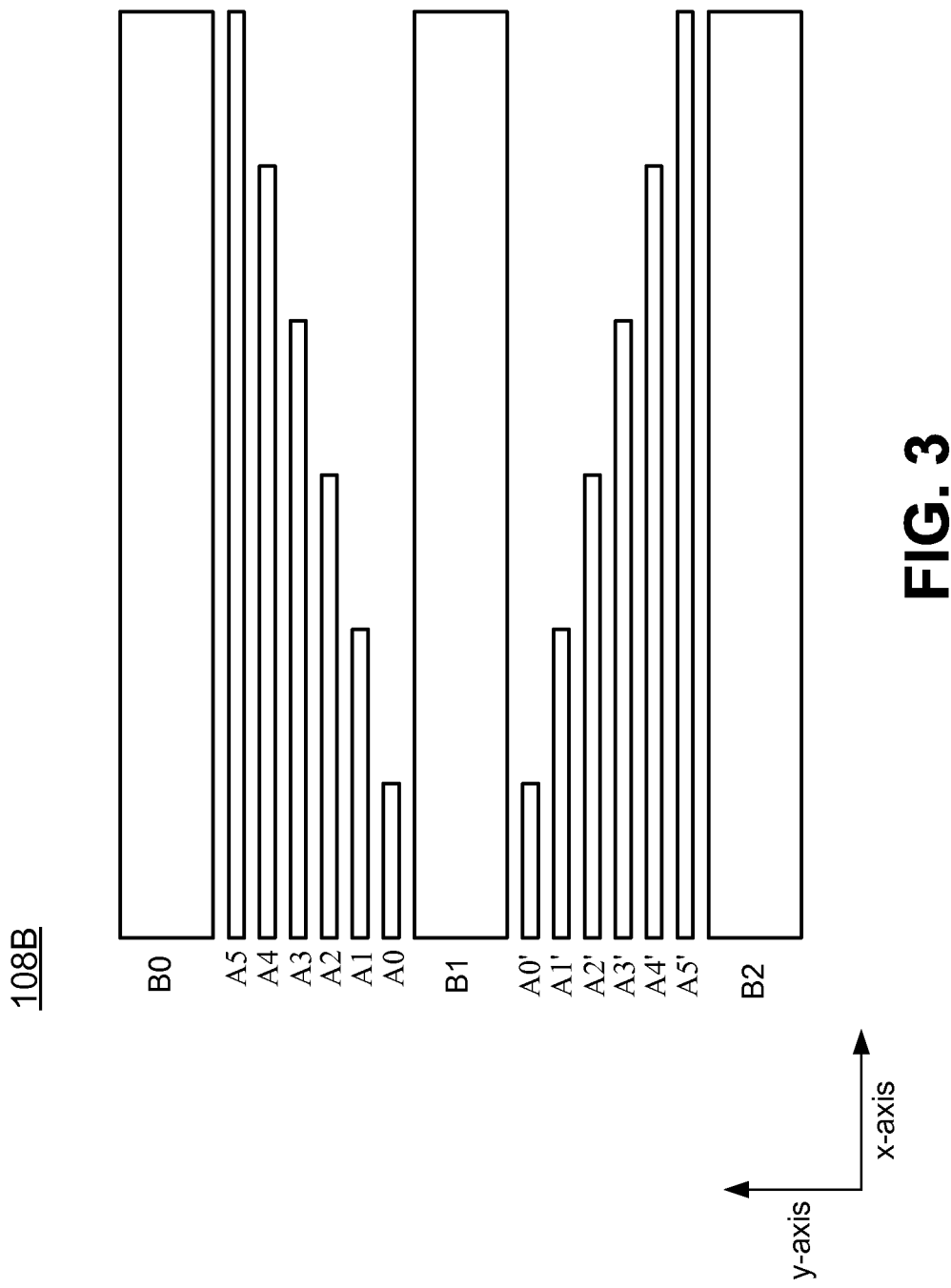

900

```
ACQUIRE A FIRST MEASUREMENT OF CAPACITIVE
COUPLING BETWEEN A FIRST SENSOR ELECTRODE OF A FIRST
SET OF SENSOR ELECTRODES AND A SENSOR ELECTRODE OF A
SECOND SET OF SENSOR ELECTRODES.
910
```

↓

```
ACQUIRE A SECOND MEASUREMENT OF CAPACITIVE COUPLING
BETWEEN A SECOND SENSOR ELECTRODE OF THE FIRST SET OF
SENSOR ELECTRODES AND THE SENSOR ELECTRODE OF THE
SECOND SET OF SENSOR ELECTRODES.
920
```

↓

```
DETERMINE A CAPACITANCE IMAGE USING THE FIRST AND
SECOND MEASUREMENTS OF CAPACITIVE COUPLING.
930
```

FIG. 9

SINGLE LAYER CAPACITIVE IMAGE SENSING

RELATED U.S. APPLICATION (PROVISIONAL)

This application claims priority to the provisional patent application Ser. No. 61/241,692, entitled "SINGLE LAYER CAPACITANCE IMAGING SENSOR," with filing date Sep. 11, 2009, and assigned to the assignee of the present invention, which is herein incorporated by reference in its entirety.

BACKGROUND

Transcapacitive sensing is a key technology in the implementation of sophisticated modern human-machine interfaces. Transcapacitive sensing can involve sensing the proximity, contact, and/or position of an input object such as, for example, a human digit (finger, thumb, toe), stylus, or writing utensil, among others. Typically, capacitive imaging sensor devices (and systems in which they are utilized) are based on measures of mutual capacitance, which is also known as transcapacitance. In some implementations, the transcapacitive measurements can be used to capture/create a transcapacitive image relative to an input interface of a sensor in the capacitive imaging sensor device.

BRIEF DESCRIPTION OF THE DRAWINGS

The accompanying drawings, which are incorporated in and form a part of the Description of Embodiments, illustrate various embodiments of the present invention and, together with the Description of Embodiments, serve to explain principles discussed below. The drawings referred to in this Brief Description of Drawings should not be understood as being drawn to scale unless specifically noted.

FIG. 3 illustrates a plan view of an example capacitive imaging sensor that may be utilized with a capacitive imaging sensor device, according to an embodiment.

FIG. 9 illustrates a flow diagram of an example method of capacitive sensing, according to an embodiment.

DESCRIPTION OF EMBODIMENTS

Figure 1:
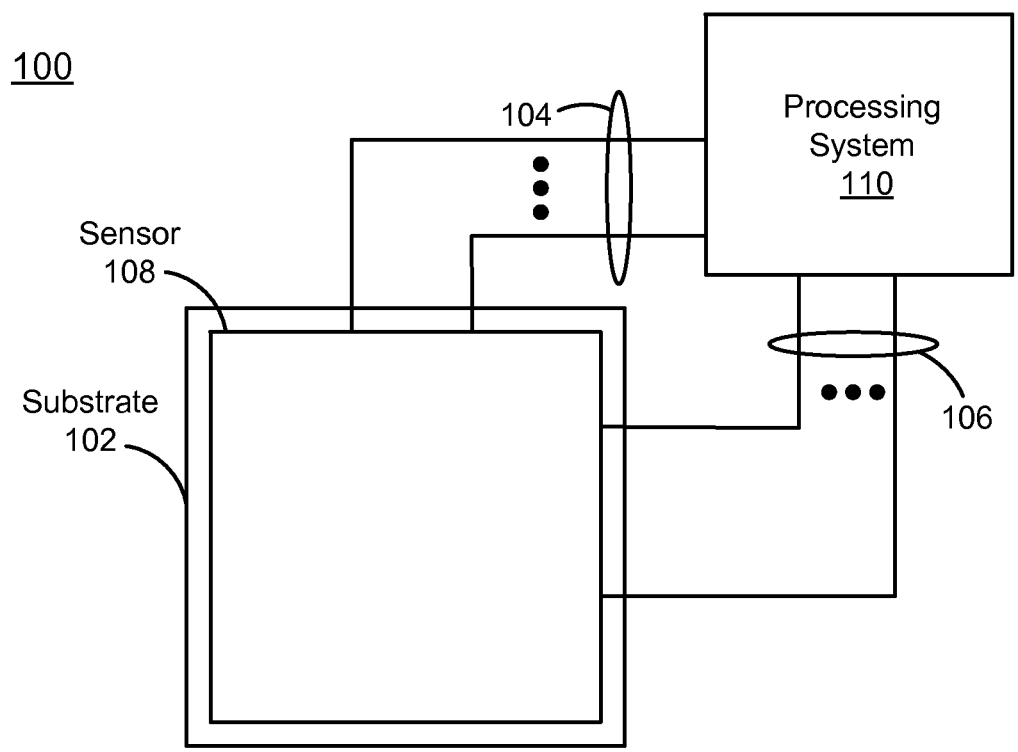
FIG. 1 is a plan view block diagram of an example capacitive image sensing device that can be implemented to include one or more embodiments of the invention.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Overview of Discussion

Most conventional multi-touch sensing sensor devices, in which the location of more than one finger or other input can be accurately determined, comprise a matrix of transmitter sensor electrodes and receiver sensor electrodes, where there is an intersection of each transmitter sensor electrode and each receiver sensor electrode. Conventionally, during operation, capacitive images are formed by measuring the capacitance at each intersection of each transmitter and receiver sensor electrodes (referred to as "transcapacitance" or "mutual capacitance"), forming a matrix or grid. The presence of an input object (such as a finger or other object) at or near an intersection changes the measured "transcapacitance". These changes are localized to the location of object, where each transcapacitive measurement is a pixel of a "capacitive image" and multiple transcapacitive measurements can be utilized to form a capacitive image of the object. Unfortunately, two layers of conductors are required within the sensing region to implement this conventional scheme (this includes sensors where one layer is conductive jumpers in the sensing region). In a material like ITO, this is expensive, requires extra processing steps, and reduces the optical quality of anything viewed through the ITO.

Herein sensor design and sensing scheme embodiments are described that allow creation of 2-D capacitance images using a single sensing layer in which all of the transmitting and receiving sensor electrodes are disposed in a single common layer with one another without the use of jumpers within the sensor area. The electronics to drive the sensor are located in a processing system, such as processing system 110 described herein. These described embodiments also facilitate contact sensing, proximity sensing, and position sensing. These described embodiments also facilitate "multi-touch" sensing, such as two finger rotation gestures and two finger pinch gestures, but with a very inexpensive sensor compared to a sensor that utilizes sensor electrodes in multiple layers. One expense reduction is due to the reduced number of layers and materials (such as ITO) in the imaging sensor. The reduced number of layers also equates to fewer production steps (which in itself is a cost reduction). The reduction in the layers of the imaging sensor also decreases interference or obscuration of an image or display that is viewed through the sensor, thus lending itself to improved optical quality.

Embodiments in accordance with the present invention achieve creation of a capacitive image using only sensor electrodes in a single layer of a sensor. In embodiments of the present invention, no sensor electrodes are layered or jumpered within the portion of the sensor used for capacitive sensing. In spite of these advantages which may be realized through layer reduction in the sensor, the embodiments described herein would not have been obvious to one of ordinary skill in the art. They would not have been obvious at least because the conventional multi-layer design of an imaging sensor is conceptually simple in that it automatically resolves capacitive image pixels at x-y crossings of the rows and columns of conventional multi-layer sensor electrode arrangements, while the embodiments described herein may be more conceptually complex and may require that image pixels be derived mathematically from capacitive measurements (taken with sensor electrodes that have no x-y crossings) and spatial data that is time multiplexed to create a capacitive image. Thus, because of the mathematical derivation involved, the locations of pixels in the embodiments of the present invention are not easily spatially recognizable to one of ordinary skill in the art.

The discussion will begin with description of an example capacitive imaging sensor device with which or upon which various embodiments described herein may be implemented. Several non-inclusive example configurations of capacitive imaging sensors (and their sensor electrodes arrangements), which can be used with the capacitive imaging sensor device, will be described. As will be explained, the capacitive imaging sensors described herein are fashioned with transmitter and receiver sensor electrodes that can be disposed upon a substrate in a single common layer with one another. Operation of the capacitive imaging sensor device will then be described in more detail in conjunction with description of an example method of capacitive sensing, according to embodiments.

Example Capacitive Imaging Sensor Device

FIG. 1 is a plan view block diagram of an example capacitive imaging sensor device 100 that can be implemented to include one or more embodiments of the present invention. Capacitive imaging sensor device 100 is a capacitive sensor device and is interchangeably referred to herein as both "capacitive imaging sensor device," "sensor device," and "device." Capacitive imaging sensor device 100 can be utilized to communicate user input via an input object (e.g., a user's finger, a probe such as a stylus, and/or some other external input object) to a computing device or other electronic device. For example, capacitive imaging sensor device 100 can be implemented as a capacitive touch screen device that can, in some embodiments, be placed over an underlying image or an information display device (not shown). In this manner, a user would view the underlying image or information display by looking through the substantially transparent sensor electrodes (not illustrated) in capacitive imaging sensor 108 of capacitive imaging sensor device 100 as shown. Capacitive imaging sensor 108 may be interchangeably referred to herein as both "capacitive imaging sensor," "imaging sensor," and "sensor." It is noted that one or more embodiments in accordance with the present invention can be incorporated with a capacitive touch screen device similar to that of capacitive imaging sensor device 100.

When in operation, capacitive imaging sensor 108 is used to form a "sensing region" for sensing inputs. "Sensing region" as used herein is intended to broadly encompass any space above, around, in and/or near the sensor device wherein the sensor, or portion(s) thereof, is able to detect an input object. A sensing region, such as that formed by capacitive imaging sensor 108, extends from a surface of the sensor device in one or more directions into space until the noise and decreased signal prevent accurate object detection. This distance may be on the order of less than a millimeter, millimeters, centimeters, or more, and may vary significantly with the type of position sensing technology used, the types of signals utilized for sensing, and the accuracy desired. Accordingly, the planarity, size, shape and exact locations of the particular sensing regions can vary widely from embodiment to embodiment.

Sensing regions with rectangular projected shape, and many other shapes are possible. For example, depending on the design of the sensor pattern and surrounding circuitry, shielding from any input objects, and the like, sensing regions can be made to have two-dimensional projections of other shapes. Similar approaches can be used to define the three-dimensional shape of the sensing region. For example, any combination of sensor design, shielding, signal manipulation, sensor electrode scanning, and the like can effectively define a sensing region that has a distance in the third dimension.

Capacitive imaging sensor device 100, when implemented as a touch screen, can include a substantially transparent substrate 102 having a first set of conductive routing traces 104 and a second set of conductive routing traces 106 patterned (or formed) coupled there to. Conductive routing traces 104 and/or 106 can be utilized for coupling processing system 110 with any sensor electrodes, arrays of sensor electrodes, and/or conductive traces that form a capacitive imaging sensor 108. For purposes of example herein, conductive routing traces 104 will be referred to as coupling transmitter pins (or channels) of processing system 110 to transmitter electrodes of capacitive imaging sensor 108, while conductive routing traces 106 will be referred to as coupling receiver pins (or channels) of processing system 110 to receiver electrodes of capacitive imaging sensor 108. It is appreciated that, in practice, some embodiments described herein may both transmit and receive with some or all sensor electrodes of a capacitive imaging sensor 108.

Although capacitive imaging sensor 108 is depicted as rectangular, other shapes, such as circular, or triangular are anticipated. Sensor electrodes of capacitive imaging sensor 108 can be formed of a substantially transparent conductive material. Indium tin oxide (ITO) is but one example of a substantially transparent conductive material that can be used to form one or more sensor electrodes or conductive traces of capacitive imaging sensor 108. Some other non-limiting examples of substantially transparent conductive materials include very fine lines of metal, nanotube conductors, conductive coated films such as AgHT (a transparent highly conductive silver coated polyester film), and/or an ionic solution such a salt water. In FIG. 1, a contactable capacitive sensing reference surface or "cover layer" is not illustrated over capacitive imaging sensor 108, so as not to obscure other portions which are being discussed. However, it is appreciated that such a capacitive sensing reference surface, which may be made of a clear material, typically separates capacitive imaging sensor 108 from a user's input object. When an input device contacts this capacitive sensing reference service, the input device is proximate to the sensor (separated by the width of the capacitive sensing reference surface).

With continued reference to FIG. 1, various embodiments can utilize transcapacitive sensing methods based on the capacitive coupling between sensor electrodes. Transcapacitive sensing methods are sometimes also referred to as "mutual capacitance sensing methods." In one embodiment, a transcapacitive sensing method operates by detecting the electric field coupling one or more transmitter sensor electrodes (which are transmitting a signal) with one or more receiver sensor electrodes. Proximate objects may cause changes in the electric field, and produce detectable changes in the transcapacitive coupling. As previously described, sensor electrodes may transmit as well as receive, either simultaneously or in a time multiplexed manner. Sensor electrodes that transmit are sometimes referred to as the "transmitting sensor electrodes," "driving sensor electrodes," "transmitters," or "drivers"—at least for the duration when they are transmitting. Other names may also be used, including contractions or combinations of the earlier names (e.g., "driving electrodes" and "driver electrodes." Sensor electrodes that receive are sometimes referred to as "receiving sensor electrodes," "receiver electrodes," or "receivers"—at least for the duration when they are receiving. Similarly, other names may also be used, including contractions or combinations of the earlier names.

Transcapacitive sensing schemes may detect changes in capacitive coupling between transmitter sensor electrodes and receiver sensor electrodes when a separate electrode (e.g., an external input object such as a human digit or a stylus) is brought near. The output of sensor 108 when employing a transcapacitive sensing scheme is often referred to as an "image" or a "capacitive image." The capacitive image includes of a plurality of pixels. Pixels of a capacitive image can be referred to as the region in which the transcapacitive coupling between transmitting sensor electrode(s) and receiving sensor electrode(s) can be detected (i.e., a measurement location between a transmitting sensor electrode and a receiving sensor electrode).

Processing system 110 drives sensor electrode(s) with a voltage and senses resulting respective charge on sensor electrode(s), to acquire one or more measurements of capacitance with respect to capacitive imaging sensor 108. Such measurement(s) of capacitance by processing system 110 enable the sensing of proximity or other user input (e.g., gestures with one or more input objects) with respect to the sensing region formed by capacitive imaging sensor 108. Such measurement(s) can also be utilized by processing system 110, in some embodiments, to determine positional information with respect to a user input relative to the sensing region formed by capacitive imaging sensor 108. Processing system 110 may be implemented as one or more integrated circuits and/or discrete components. By sequencing the transmitters and deconvolving the resulting capacitance measurements, processing system 110 may determine the positions of one or more input objects. In one embodiment, processing system 110 includes or is implemented within an application specific integrated circuit (ASIC). In accordance with the embodiments described herein, such an ASIC can include components and/or embedded logic instructions for performing capacitance measurement(s) and determining proximity, contact, positional information, and/or other information from input object(s) interactions with respect to a sensing region of capacitive imaging sensor 108.

The positional information determined by processing system 110 can be any suitable indicia of object presence. For example, the processing system can be implemented to determine "zero-dimensional" 1-bit positional information (e.g., near/far or proximate/not proximate or contact/no contact) or "one-dimensional" positional information as a scalar (e.g., position or motion along a sensing region). Processing system 110 can also be implemented to determine multi-dimensional positional information as a combination of values (e.g., two-dimensional horizontal/vertical axes), and the like. Processing system 110 can also be implemented to determine information about time or history.

Furthermore, the term "positional information" as used herein is intended to broadly encompass absolute and relative position-type information, and also other types of spatial-domain information such as velocity, acceleration, and the like, including measurement of motion in one or more directions. Various forms of positional information may also include time history components, as in the case of gesture recognition and the like. The positional information from the processing system 110 facilitates a full range of interface inputs, including use of the proximity sensor device as a pointing device for cursor control, scrolling, and other functions.

Conductive routing traces 104 and 106 may each include one or more conductive coupling elements or traces. It is noted that some example embodiments of sensor electrode patterns, which may be used as capacitive imaging sensor 108, are described herein in FIGS. 2A-8. It is appreciated that the examples of FIGS. 2A-8 are provided by way of example and not of limitation. In general, other capacitive sensor electrode patterns that follow the principles described herein can also be used in capacitive imaging sensor 108 for measuring capacitance. This includes capacitive imaging sensors comprising sensor electrodes disposed in a single layer (as depicted in FIGS. 2A-7) or even multi-layer sensor electrode patterns that follow the principles of the embodiments described herein.

Although described above with respect to a touch screen, capacitive imaging sensor device 100 can also be implemented as a capacitive touchpad or other touch and/or position sensing device. For example, substrate 102 of capacitive imaging sensor device 100 can be implemented with, but is not limited to, one or more clear or opaque materials that are utilized as a substrate for a capacitive touchpad device. In a similar manner, clear or opaque materials can also be utilized to form sensor electrodes in capacitive imaging sensor 108. Additionally, clear or opaque materials can be used to implement a capacitive sensing reference surface or "cover layer" over capacitive imaging sensor 108.

Example Capacitive Imaging Sensors

Figure 2A:
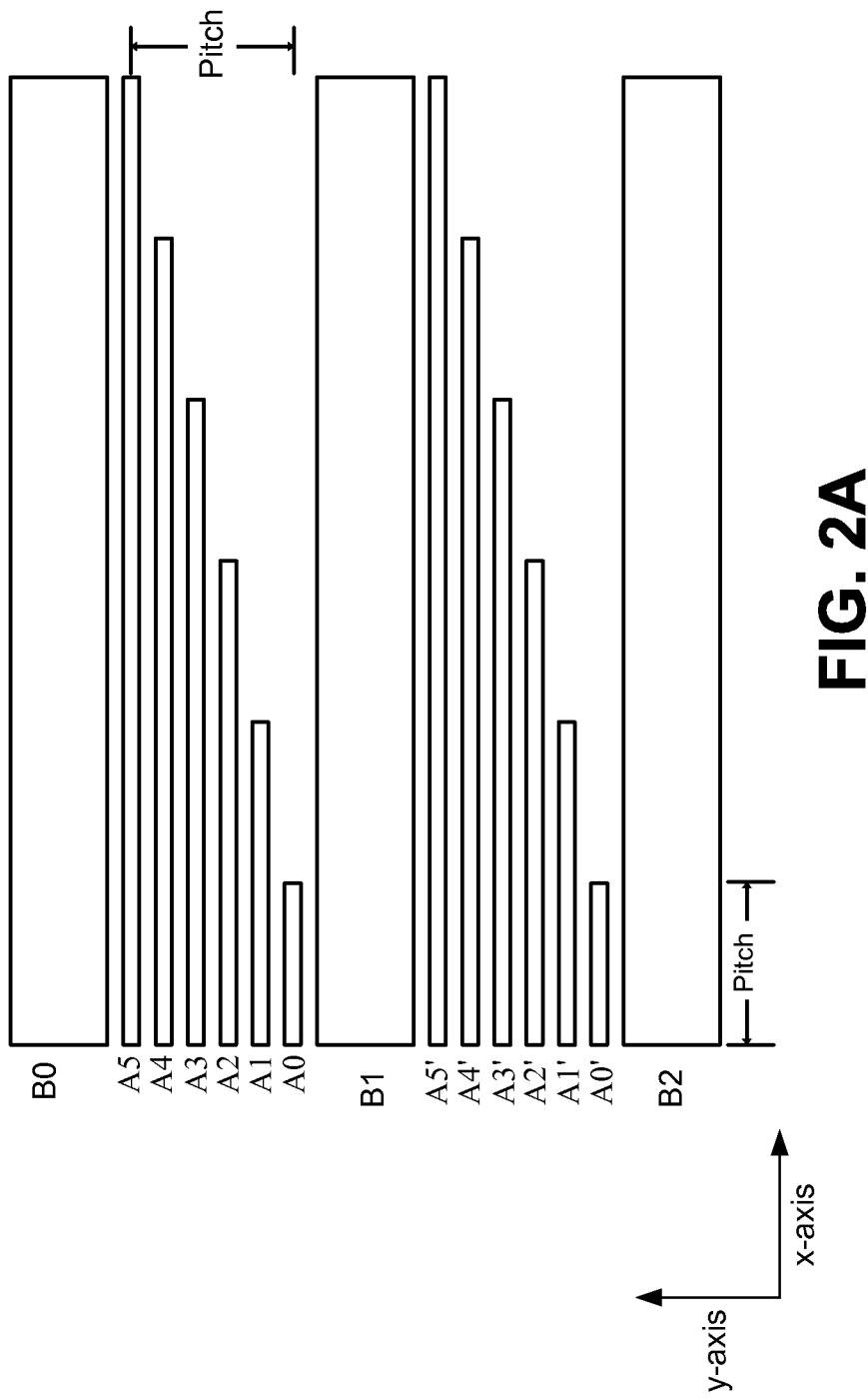
FIG. 2A illustrates a plan view of an example capacitive imaging sensor that may be utilized with a capacitive imaging sensor device, according to an embodiment.

FIG. 2A illustrates a plan view of an example capacitive imaging sensor 108A that may be utilized with a capacitive imaging sensor device, according to an embodiment. For example, capacitive imaging sensor 108A represents an example of a capacitive imaging sensor 108 that may be used with capacitive imaging sensor device 100 of FIG. 1. For reference purposes during description an x-axis and a y-axis are illustrated with respect to capacitive imaging sensor 108A. As illustrated, capacitive imaging sensor 108B includes a plurality of sensor electrodes (A0-A5, A0'-A5', B0, B1, and B2).

In various embodiments either of the A set or B set of sensor electrodes can be used as transmitters or receivers. However, for ease of explanation, examples herein will describe the A set of sensor electrodes as being used as transmitters and the B set of sensor electrodes as being used as receivers. Thus, in one embodiment, sensor electrodes A0-A5 and A0'-A5' are coupled with conductive routing traces 104 of sensor device 100, while B0, B1, and B2 are coupled with conductive routing traces 106 of sensor device 100. In one embodiment, each of A0-A5 and A0'-A5' is coupled to a separate routing trace 104. In another embodiment, like sensor electrodes (e.g., A0 and A0') are commonly coupled to a single routing trace. Such common coupling may require jumpers, which can be placed outside of the sensing region to avoid use of jumpers or layers on sensor 108A. In one embodiment, each of B0, B1, and B2 is coupled to a separate routing trace 106.

In sensor 108A, sensor electrodes A0-A5 and A0'-A5' belong to a first set of sensor electrodes (the "A set") that are disposed on a first surface of a sensor substrate such as substrate 102. As can be seen, sensor electrodes A0-A5 and A0'-A5' are disposed substantially in parallel with a common axis, such as an x-axis of a Cartesian coordinate system. As can also be seen, at least two sensor electrodes of this A set of sensor electrodes extend for different lengths along the first axis. For example, sensor electrode A0 extends for a different length along this common axis that sensor electrode A1. Sensor electrodes A0-A5 and A0'-A5' are disposed in the same layer as one another.

In sensor 108A, sensor electrodes B0, B1, and B2 belong to a second set of sensor electrodes (the "B set") that are also disposed on the first surface of the same sensor substrate along with the A set. As can be seen, sensor electrodes B0, B1, and B2 are disposed substantially in parallel with the same common axis, such as an x-axis of a Cartesian coordinate system, as the sensor electrodes of the A set. In one embodiment, the B set of sensor electrodes is disposed on the substrate in the same layer as the A set of sensor electrodes.

As is illustrated by FIG. 2A, in one embodiment, a first plurality of sensor electrodes (e.g., A0-A5) of the A set of sensor electrodes is disposed (bracketed) between two sensor electrodes (e.g., B0 and B1) of the B set of sensor electrodes. In one embodiment, sensor electrodes of the B set of sensor electrodes (e.g., B0, B1, B2, etc.) are rectangular, bar shaped sensor electrodes. In one embodiment, a second plurality A0'-A5' of the A set of sensor electrodes is disposed between a differing pair of sensor electrodes (e.g., B1 and B2) of the B set of sensor electrodes. In one embodiment, as shown in FIG. 2A, sensor electrodes A0'-A5' are a translated (y-axis translation with respect to FIG. 2A) copy of sensor electrodes A0-A5. In other embodiments, sensor electrodes A0'-A5' may be a translated rotation or translated reflection (see e.g., FIG. 3).

The set of A sensor electrodes includes a first plurality n of A sensor electrodes (e.g., A0-A5) that are all of different length from one another. In one embodiment, sensor electrodes of this first plurality of A sensor electrodes (e.g., A0-A5) are arranged on a surface of the substrate in order of length from short to long or long to short. In one embodiment, the length along an axis (e.g., x-axis) of each sensor electrode in this first plurality is a multiple of the sensor pitch utilized in a particular sensor 108. That is, each progressively longer sensor electrode is one unit of pitch longer on this axis than the next shorter sensor electrode. For example, following this scheme, if sensor electrode A0 has a length along an x-axis of one pitch unit, then sensor electrode A1 has a length defined by the length of A0+1 pitch unit, likewise, sensor electrode has a length along the x-axis defined by the length of A1+1 pitch unit, and so on. Typically the pitch unit is sized relative to the input object that is expected to be used. For example, the pitch of a sensor 108 can be selected to accommodate a wide variety of finger sizes. In one embodiment, the spacing between sensor electrode A0 and A5 (center to center) of sensor 108A is also substantially one pitch unit, but this is not required. In one embodiment, a pitch unit of a sensor 108 is approximately 5 mm, however in other embodiments a pitch unit of a sensor 108 may be different, such as, but not limited to, 3 mm, or 6 mm, or 7 mm.

In one embodiment, sensor electrodes of the B set of sensor electrodes (e.g., B0, B1, B2, etc.) have a width (e.g., width measured on a y-axis relative to sensor 108A) that is substantially wider (multiple times wider) than any sensor electrode of the A set of sensor electrodes. In one embodiment, sensor electrodes of the A set of sensor electrodes are all of substantially the same width (e.g., width measured on a y-axis relative to sensor 108A). In one embodiment, sensor electrodes of the B and A set are all of substantially the same width (e.g., width measured on a y-axis relative to sensor 108A).

Although six sensor electrodes are shown in the plurality of A sensor electrodes that are disposed between sensor electrodes B0 and B1, the number may be scaled up or down as long as there are at least two A sensor electrodes. In one embodiment, to enlarge the area of sensor 108A additional A sensor electrodes and B sensor electrodes may be included in the same fashion, such by repeating the pattern of A5 to B1 (inclusive) below sensor electrode B2.

Figure 2B:
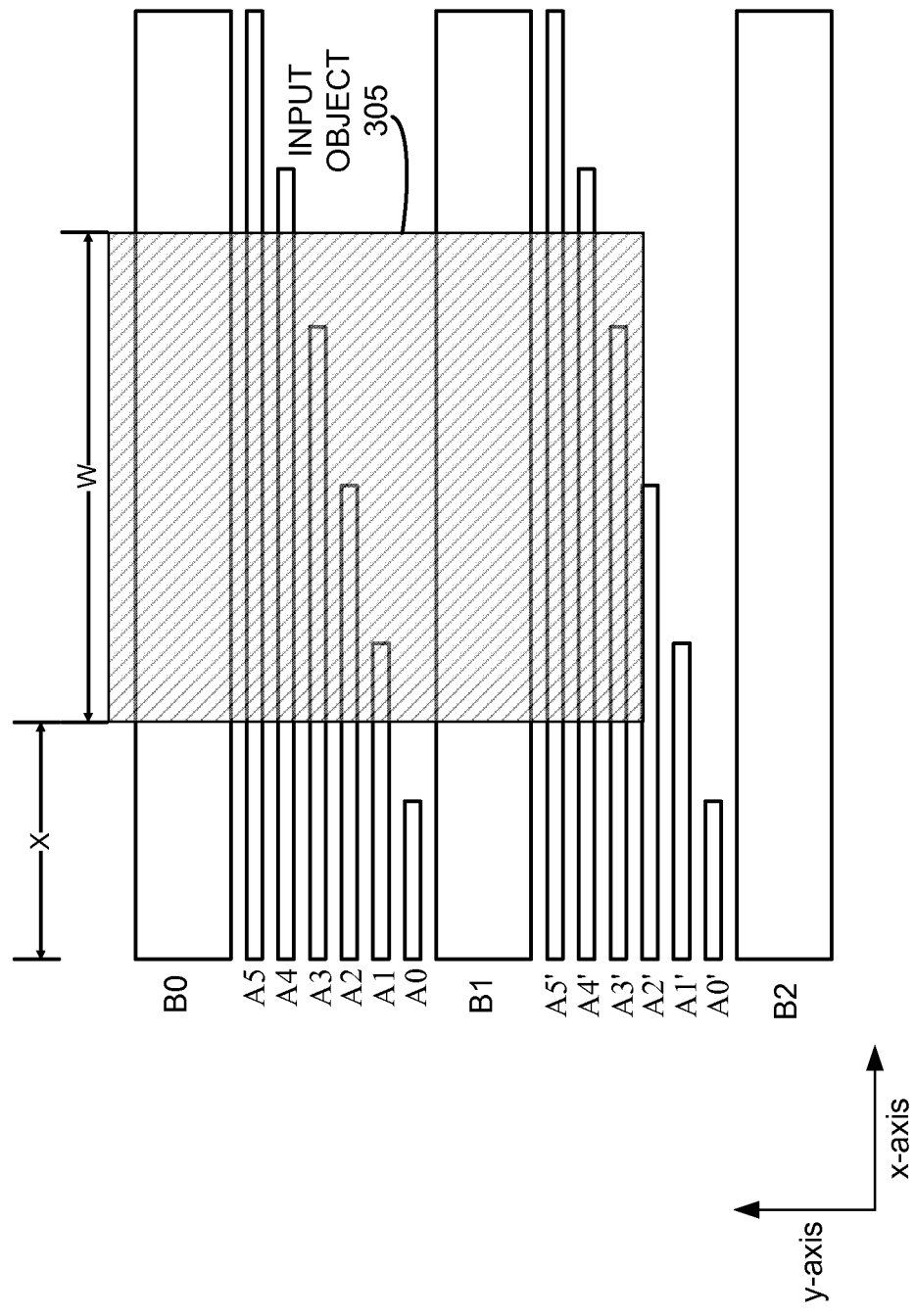
FIG. 2B illustrates the outline of an example input object superimposed upon a plan view of an example capacitive imaging sensor that may be utilized with a capacitive imaging sensor device, according to an embodiment.

FIG. 2B illustrates the outline of an example input object 305 superimposed upon a plan view of the example capacitive imaging sensor 108A of FIG. 2A, according to an embodiment. Like labeled elements in FIG. 2B are the same as those which are illustrated in FIG. 2A. Input object 305 is modeled as having a rectangular imprint or coverage when interacting with sensor 108A. This single rectangular shape was chosen for ease of explanation of principles of operation, however it is appreciated that multiple input objects of virtually any shaped outline may occur as inputs and will be treated in the manner described with respect to input object 305.

In imaging sensor 108A, the transmitter sensor electrodes, An and An' (A0-A5 and A0'-A5' in this example), are bracketed between the receiver sensor electrodes, Bm (B0-B2 in this example). Furthermore, the transmitters bracketed between sensor electrodes B1 and B2 (marked as An') may be separate transmitters or electrically connected to like sensor electrodes of the plurality of An sensor electrodes that are disposed between sensor electrodes B0 and B1. In one embodiment, with respect to the transmitter sensor electrodes A0-A5, in operation, each transmitter sensor electrode, An, has a capacitive coupling, Cmn, to a receiver sensor electrode, Bm. The receiver sensor electrodes and transmitter sensor electrodes are coupled to a processing system, such as processing system 110 (or other "transcapacitance" measurement device such as a charge integrator), for capacitive sensing. In one embodiment, processing system 110, for example, can activate one transmitter sensor electrode at a time to get a unique measurement of Cmn between the activated transmitter sensor electrode and a particular receiver sensor electrode. In another embodiment, processing system 110 can use a method called differential drive, activating one pair of transmitter sensor electrode at a time to get a unique measurement of Cmn between each of the activated transmitter sensor electrodes, An, and a particular receiver sensor electrode, Bm. In the presence of an input object 305, such as a human digit, the change in capacitive coupling, $\Delta$Cmn, is approximately related to the length of overlap between the input object and the activated transmitter sensor electrodes.

In this example of FIG. 2B, input object 305 is modeled as a rectangle of width and height 'W' (in transmitter pitch units). As previously described, the length of each transmitter, An and An', is 'n+1' (in transmitter pitch units).

In one embodiment, processing system 110 measures capacitive couplings between a plurality of transmitter sensor electrodes, An, and a receiver sensor electrode, Bm. In one embodiment, processing system 110 is configured to use a differential drive method, where processing system 110 drives a first transmitter sensor electrode, An, with a positive signal and simultaneously drives the adjacent transmitter sensor electrode, An−1, with the inverse (negative) signal. Receiver sensor electrode, Bm, receives the signals through a capacitive coupling between An and Bm (Cmn) and An−1 and Bm (Cmn−1). Processing system 110 measures the received signals to determine a change in each capacitive coupling ($\Delta$Cmn and $\Delta$Cmn−1). The measurement of each received signal and each change in capacitive coupling is related to the amount an input object overlaps a driven transmitter sensor electrode and receiver sensor electrode pair. Processing system 110 determines a portion of a capacitive image (i.e., a pixel of a capacitive image) based at least in part on each change in capacitive coupling ($\Delta Cmn$ and $\Delta Cmn-1$). In one embodiment, the difference between the capacitive couplings is used to determine a portion of a capacitive image.

In another embodiment, the transmitting and receiving sensor electrodes can be reversed and processing system 110 drives a sensor electrode Bm (e.g., B0) sequentially with positive and then negative signals while receiving simultaneously or in a scanned approach with pairs of adjacent sensor electrodes An (e.g., A1 and A0). Receiver sensor electrode, An and An-1, receive the signals through a capacitive coupling between An and Bm (Cmn) and An-1 and Bm (Cmn-1). Processing system 110 measures the received signals to determine a change in each capacitive coupling ($\Delta Cmn$ and $\Delta Cmn-1$). The measurement of each received signal and each change in capacitive coupling is related to the amount an input object overlaps a driven transmitter sensor electrode and receiver sensor electrode pair. Processing system 110 determines a portion of a capacitive image (i.e., a pixel of a capacitive image) based at least in part on each change in capacitive coupling ($\Delta Cmn$ and $\Delta Cmn-1$). In one embodiment, the difference between the capacitive couplings is used to determine a portion of a capacitive image.

In FIG. 2B, for example, when processing system 110 drives sensor electrode A5 with a positive signal and sensor electrode A4 with a negative (inverse) signal, the measure of each change in capacitive coupling (i.e., $\Delta C05$ and $\Delta C04$) changes by the substantially same amount, "W", resulting in a net difference of "0", as input object 305 overlaps both transmitter the same amount. When processing system 110 drives sensor electrode A4 with a positive signal and sensor electrode A3 with a negative signal, the net measurement is W-X-(3-1) (which is scaled in terms of capacitance). This is due to input object 305 overlapping sensor electrode A4 by 'W' and input object 305 overlapping sensor electrode A3 by 3 pitch units+1 pitch unit-X, where 3 pitch units+1 pitch unit is the length of sensor electrode A3 in pitch units and X is the distance from a common side of each sensor electrode to the input object.

Table 1, below summarizes the remaining measurement combinations taken in this manner by driving sensor electrodes A0-A5.

TABLE 1

Example Results of Differential Drive Combinations for Imaging Sensor 108A in FIG. 2B

| positive signal | negative signal | positive measurement | negative measurement | net measurement |
|---|---|---|---|---|
| A5 | A4 | W | -W | 0 |
| A4 | A3 | W | (3 + 1) - X | W - X + (3 + 1) |
| A3 | A2 | X - (3 + 1) | (2 + 1) - X | -1 |
| A2 | A1 | X - (2 + 1) | (1 + 1) - X | -1 |
| A1 | A0 | X - (1 + 1) | 0 | X - (1 + 1) |
| A0 | — | 0 | 0 | 0 |

Table 1 above describes driving the transmitter sensor electrodes differentially, one positive, one negative, at the same time. It is also possible for processing system 110 to only drive one transmitter at a time, and then mathematically deconvolve the pixels of a capacitive image. Furthermore, groups of transmitters may be driven with some more complex calculations performed by processing system 110 being performed to mathematically deconvolve pixels of a capacitive image. In one embodiment, like adjacent sensor electrodes (e.g., A0 and A0') are not electrically connected with one another, and thus are not coupled with the same to the same routing trace 104. Such a configuration allows like adjacent sensor electrodes (e.g., A0 and A0') to be driven at different times in order to achieve more spatial resolution perpendicular to the receiver sensor electrodes (Bm). Alternatively, such a configuration allows like adjacent sensor electrodes (e.g., A0 and A0') to be driven simultaneously to reduce the amount of time necessary for a complete measurement and construction of a complete capacitive image with the sensor.

In addition to automatically resolving the location of the input object, using differential drive has the advantage of limiting the dynamic range of the measured capacitive coupling. In one embodiment, the maximum capacitive coupling can only be as large as the difference in lengths of two transmitters (where the length is scaled to capacitance). If multiple input objects overlay a receiver or receivers, differential drive automatically resolves them along the length of the receivers.

In other embodiments, when the processing system 110 does not use differential drive, the change in capacitive coupling can be as large as the width of the input object, or objects.

In many embodiments, sensor 108A is able to determine the location of an input object 305 when at least a subset of the transmitter sensor electrodes are partially overlapped by input object 305. Further, when two (or more) input objects are within the sensing region, and each input object partially overlaps different transmitter sensor electrodes (e.g., A0-A5), each input object is distinguishable. It is appreciated that like sensor electrodes, A0'-A5', can be driven simultaneously with their like counterparts, sensor electrodes A0-A5, or at different times. For example, in one embodiment, sensor electrodes A0-A5 can be sequentially driven and then sensor electrodes A0' to A5' can be sequentially driven.

It is appreciated that in other embodiments, all positive or all negative drive signals and different techniques for determining changes in transcapacitive couplings between adjacent transmitter sensor electrodes and receiver sensor electrodes can be used. It is also appreciated that the above techniques can be similarly implemented by driving on one or more sensor electrodes Bm and receiving in a time sequenced manner on sensor electrodes An and/or An'.

FIG. 3 illustrates a plan view of an example capacitive imaging sensor 108B that may be utilized with a capacitive imaging sensor device 100, according to an embodiment. For example, capacitive imaging sensor 108B represents an example of a capacitive imaging sensor 108 that may be used with capacitive imaging sensor device 100 of FIG. 1. For reference purposes during description an x-axis and a y-axis are illustrated with respect to capacitive imaging sensor 108B. As can be seen, the spatial ordering of a like plurality of sensor electrodes (A0-A5 versus A0'-A5') can be altered from what has been previously illustrated in FIGS. 2A and 2B. As depicted, sensor electrodes A0' to A5' in sensor 108B are a plurality of sensor electrodes of the A set of sensor electrodes that have been disposed as a reflection of sensor electrodes A0-A5. This is a simple reversal of the length ordering in alternating y-axis pluralities of the A set of sensor electrodes. It should be appreciated, however, that there is no requirement for the sensor electrodes of the A set to be ordered by length. For example, each plurality of A sensor electrodes that is bracketed between B sensor electrodes could be randomly ordered (by length) to reduce the appearance of visual artifacts which might be discernable due to a repeating pattern.

Figure 4:
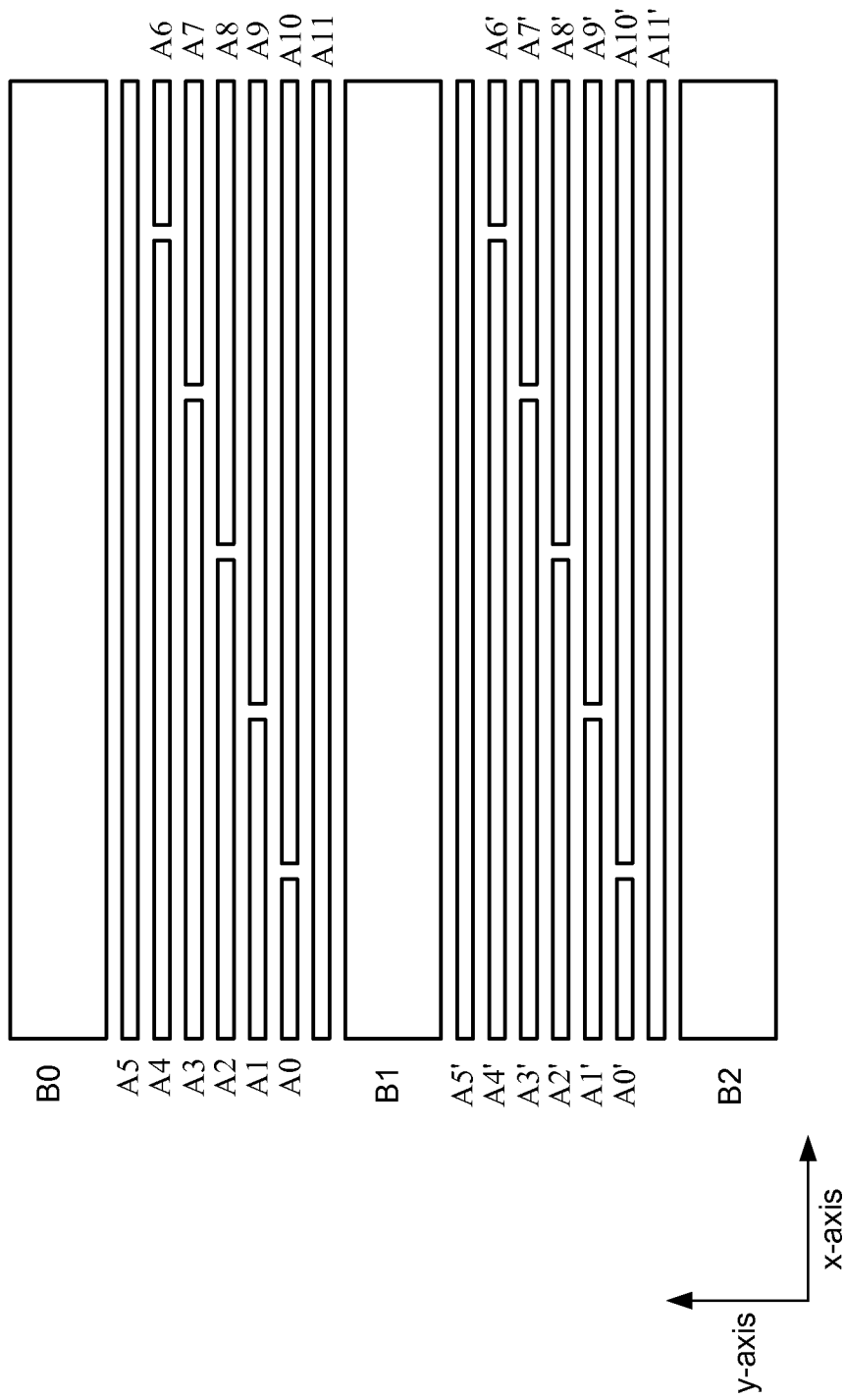
FIG. 4 illustrates a plan view of an example capacitive imaging sensor that may be utilized with a capacitive imaging sensor device, according to an embodiment.

FIG. 4 illustrates a plan view of an example capacitive imaging sensor 108C that may be utilized with a capacitive imaging sensor device, according to an embodiment. For example, capacitive imaging sensor 108C represents an example of a capacitive imaging sensor 108 that may be used with capacitive imaging sensor device 100 of FIG. 1. For reference purposes during description an x-axis and a y-axis are illustrated with respect to capacitive imaging sensor 108C. As illustrated, capacitive imaging sensor 108B includes a plurality of sensor electrodes (A1-A5, A6-A11, A0'-A5', A0'-A11', B0, B1, and B2). Sensor 108C operates in the same fashion as sensor 108A. In sensor 108C, sensor electrodes A6-A11 have been included with sensor electrodes A0-A5 that are bracketed between B0 and B1. Likewise, sensor electrodes A6'-A11' have been included with sensor electrodes A0'-A5' that are bracket between sensor electrodes B1 and B2. Sensor electrodes A6-A11 and A6'-A11' can be described as being complementary sensor electrodes to sensor electrodes A0-A5 and A0'-A5' respectively, and can be used to balance the measured capacitances. Furthermore, by roughly doubling the number of measurements possible, the signal to noise ratio may also be improved. Additionally, the optical properties of sensor 108C may also be made more uniform by having more complete coverage of the surface of the substrate with the material used for implementing the sensor electrodes. As can be seen sensor electrodes A6-A11 are a plurality of sensor electrodes that represent a 180 degree rotational copy (with a small y-axis shift) of sensor electrodes A0-A5. The small y-axis shift makes the depicted arrangement technically semi-complementary, as sensor electrodes A5 and A11 each run for the entire length of a B sensor electrode without having another sensor electrode in line with their respective long axis.

Figure 5:
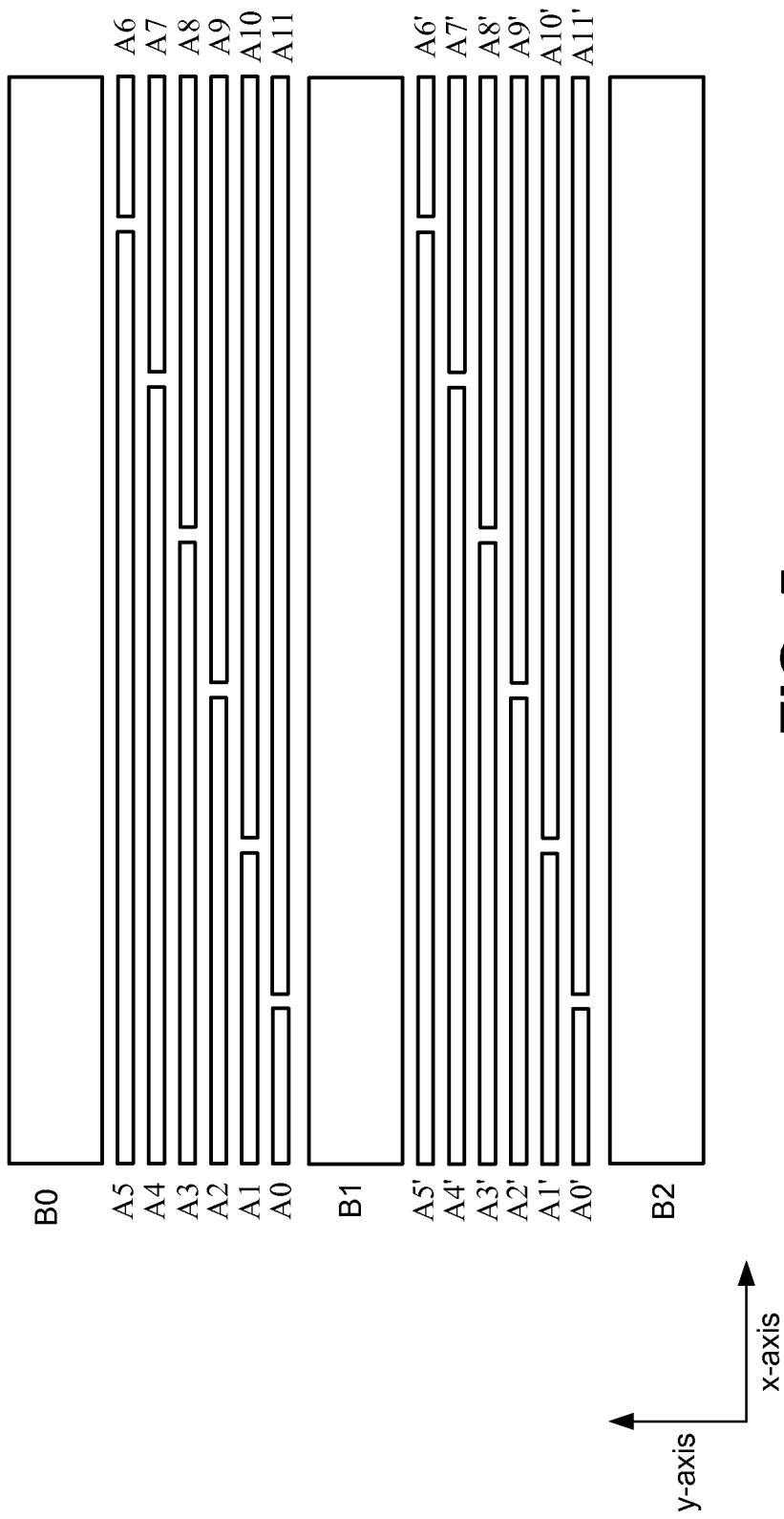
FIG. 5 illustrates a plan view of an example capacitive imaging sensor that may be utilized with a capacitive imaging sensor device, according to an embodiment.

FIG. 5 illustrates a plan view of an example capacitive imaging sensor 108D that may be utilized with a capacitive imaging sensor device, according to an embodiment. For example, capacitive imaging sensor 108D represents an example of a capacitive imaging sensor 108 that may be used with capacitive imaging sensor device 100 of FIG. 1. For reference purposes during description an x-axis and a y-axis are illustrated with respect to capacitive imaging sensor 108D. As can be seen sensor electrodes A6-A11 are a plurality of sensor electrodes that represent a 180 degree rotational copy of sensor electrodes A0-A5. Capacitive imaging sensor 108D is an alternative arrangement to the arrangement shown in FIG. 4, and is more truly complementary. As can be seen, sensor 108D is similar to the arrangement of sensor 108C except that each of the A sensor electrodes have a complement disposed in line with their long axis. For example, sensor electrode A5 is complemented by sensor electrode A6 in the embodiment illustrated in FIG. 5. This differs from the embodiment of FIG. 4 where some sensor electrodes (e.g., sensor electrodes A5 and A11) did not have a complementary sensor electrode disposed in line with their respective long axis.

With reference to FIGS. 4 and 5, it is appreciated that complementary sensor electrodes such as A6-A11, can be coupled with an AC ground in some embodiments (e.g., ground or Vdd) or be left electrically floating. This gives the benefits of more uniform optical and capacitance properties without the need for extra wiring to couple sensor electrodes A 6-A11 with a processing system or driver.

Figure 6:
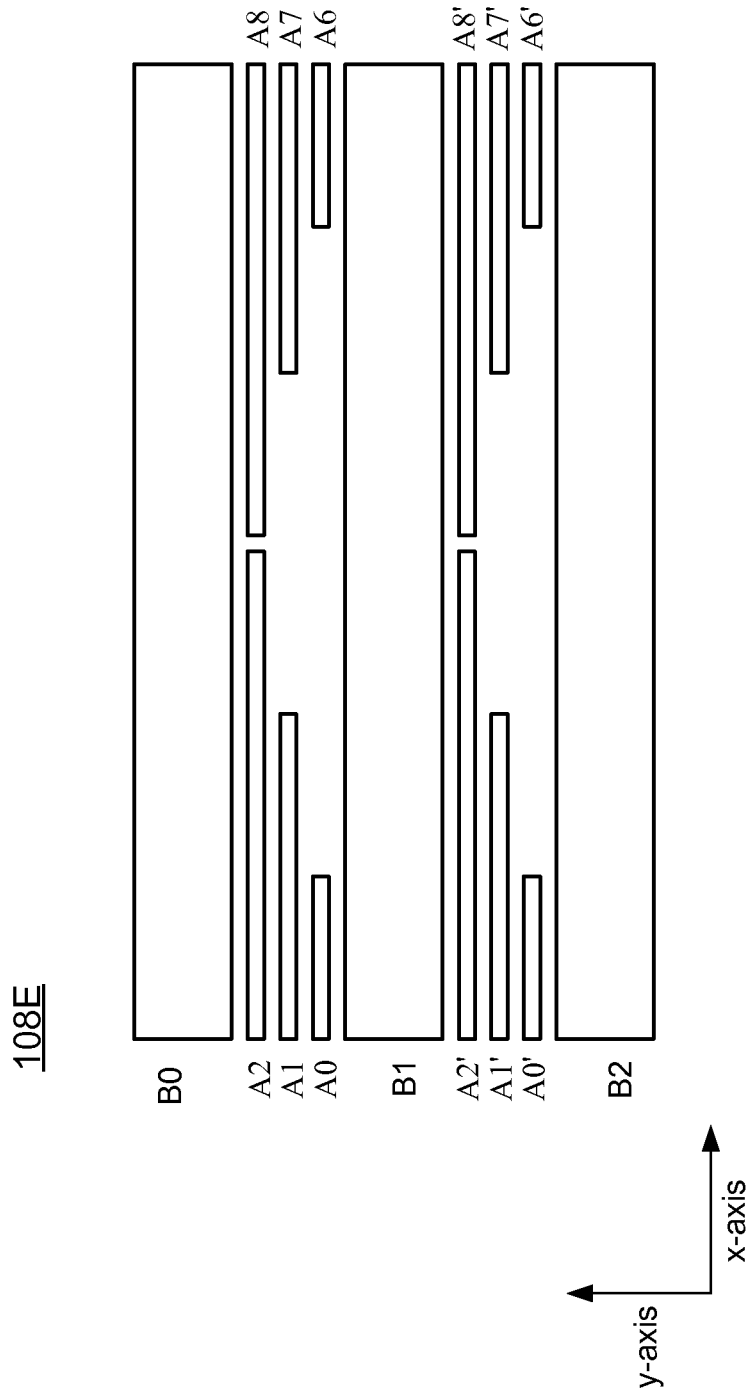
FIG. 6 illustrates a plan view of an example capacitive imaging sensor that may be utilized with a capacitive imaging sensor device, according to an embodiment.

FIG. 6 illustrates a plan view of an example capacitive imaging sensor 108E that may be utilized with a capacitive imaging sensor device, according to an embodiment. For example, capacitive imaging sensor 108E represents an example of a capacitive imaging sensor 108 that may be used with capacitive imaging sensor device 100 of FIG. 1. For reference purposes during description an x-axis and a y-axis are illustrated with respect to capacitive imaging sensor 108E. As illustrated, capacitive imaging sensor 108E includes a plurality of sensor electrodes (A0-A2, A6-A8, A0'-A2', A6'-A8', B0, B1, and B2). Sensor electrodes A6-A8 are a plurality of sensor electrodes of the A set of sensor electrodes that represent a reflected copy of sensor electrodes A0-A2, all of which are bracketed by sensor electrodes B0 and B1. By splitting the left and right halves of the sensor in the fashion shown, the number of transmitters per side is reduced, but the sensor still retains resolution over the entire sensing surface. In one embodiment, processing system 110 accomplishes sensing by sequencing transmissions in time with sensing performed with A0-A2 during a first period of time (in the manner previously described), and performed with A6-A8 during a second period of time. Alternatively, processing system 110 can drive left (A0-A2) and right (A6-A8) transmitter sensor electrodes simultaneously for some capacitance measurements.

Figure 7:
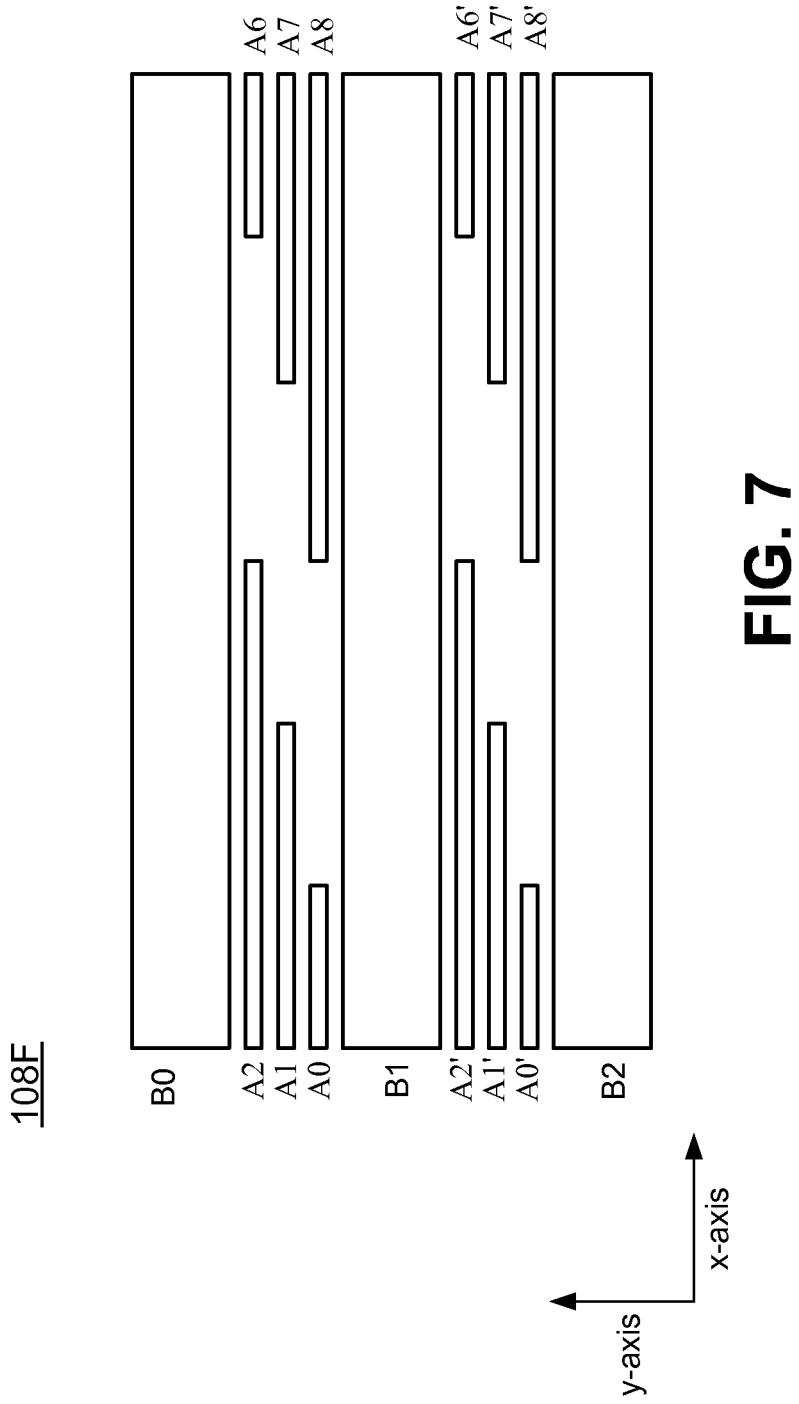
FIG. 7 illustrates a plan view of an example capacitive imaging sensor that may be utilized with a capacitive imaging sensor device, according to an embodiment.

FIG. 7 illustrates a plan view of an example capacitive imaging sensor 108F that may be utilized with a capacitive imaging sensor device, according to an embodiment. For example, capacitive imaging sensor 108F represents an example of a capacitive imaging sensor 108 that may be used with capacitive imaging sensor device 100 of FIG. 1. For reference purposes during description an x-axis and a y-axis are illustrated with respect to capacitive imaging sensor 108F. As illustrated, capacitive imaging sensor 108F includes a plurality of sensor electrodes (A0-A2, A6-A8, A0'-A2', A6'-A8', B0, B1, and B2). This is similar to FIG. 6, except for the physical layout of the transmitters being somewhat of a complementary arrangement. Sensor electrodes A6-A8 are a plurality of sensor electrodes of the A set of sensor electrodes that represent a 180 degree rotational copy of sensor electrodes A0-A2, all of which are bracketed by sensor electrodes B0 and B1. By splitting the left and right halves of the sensor in the fashion shown, the number of transmitters per side is reduced, but the sensor still retains resolution over the entire sensing surface. In one embodiment, processing system 110 accomplishes sensing by sequencing transmissions in time with sensing performed with A0-A2 during a first period of time (in the manner previously described), and performed with A6-A8 during a second period of time. Alternatively, processing system 110 can drive left (A0-A2) and right (A6-A8) transmitter sensor electrodes simultaneously for some capacitance measurements. In one embodiment, a small variation to sensor 108F would include an extra set of A electrodes that overlap by one transmitter pitch in the middle.

Figure 8:
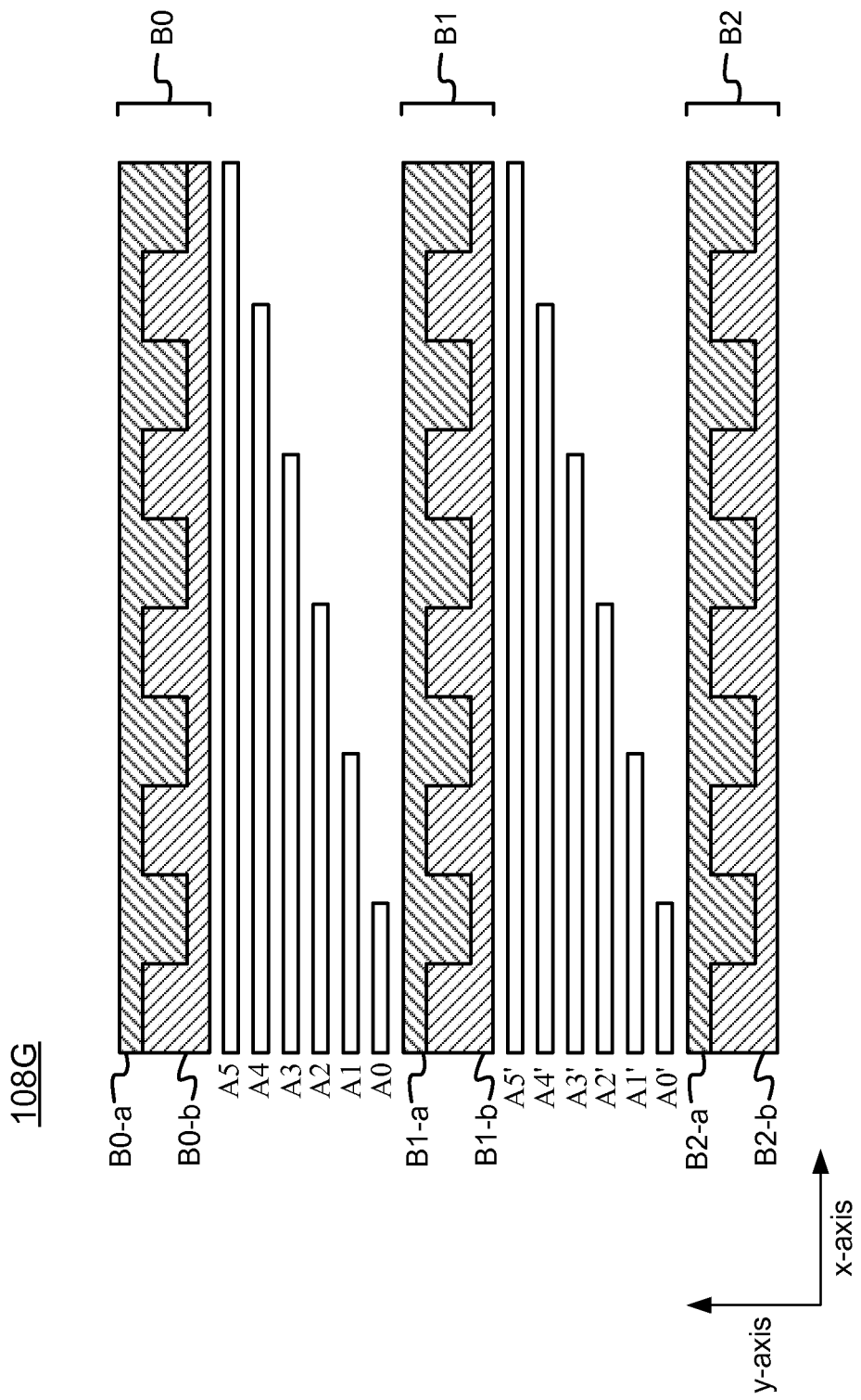
FIG. 8 illustrates a plan view of an example capacitive imaging sensor that may be utilized with a capacitive imaging sensor device, according to an embodiment.

FIG. 8 illustrates a plan view of an example capacitive imaging sensor 108G that may be utilized with a capacitive imaging sensor device, according to an embodiment. For example, capacitive imaging sensor 108G represents an example of a capacitive imaging sensor 108 that may be used with capacitive imaging sensor device 100 of FIG. 1. For reference purposes during description an x-axis and a y-axis are illustrated with respect to capacitive imaging sensor 108G. As illustrated, capacitive imaging sensor 108G includes a plurality of electrodes (A0-A5, A0'-A5', B0 (comprised of B0-a, B0-b), B1 (comprised of B1-a, B1-b), and B2 (comprised of B2-a and B2-b). Capacitive imaging sensor 108G is similar to capacitive imaging sensor 108A; however, capacitive imaging sensor 108G further comprises sensor electrodes B0, B1, and B2 which are made up of interdigitated portions which can be used together as a single electrode or separately as individual sensor electrodes. As illustrated, sensor electrode B0-a is interdigitated with sensor electrode B0-b to form sensor electrode B0, sensor electrode B1-a is interdigitated with B1-b to form sensor electrode B1, and sensor electrode B2-a is interdigitated with sensor electrode B2-*b* to form sensor electrode B2. As illustrated sensor electrodes B0 and B1 bracket sensor electrodes A0-A5, and sensor electrodes B1 and B2 bracket sensor electrodes A0'-A5'.

In operation, capacitive imaging sensor 108G may be configured to use any of the above described methods that have been previously discussed; however, the additional interdigitated portions of sensor electrodes B0, B1 and B2 allow for additional capacitive measurements to be made. These additional capacitive measurements increase the spatial resolution of capacitive imaging sensor 108G. In various embodiments, when sensor electrodes B0-*a*, B0-*b*, B1-*a*, B1-*b*, B2-*a*, and B2-*b* are configured to perform as receiver sensor electrodes, processing system 110 may receive with all of the sensor electrodes at the same time, one-at-a-time (in any order or sequentially), in adjacent sets (e.g., B0-*a* and B0-*b*, or B1-*a* and B1-*b*, or B2-*a* and B2-*b*) or in non-adjacent sets (e.g., B0-*a*, B1-*a* and/or B2*a* or B0-*b*, B1-*b* and/or B2-*b*). In other embodiments, when sensor electrodes B0-*a*, B0-*b*, B1-*a*, B1-*b*, B2-*a*, and B2-*b* are configured to perform as transmitter sensor electrodes, processing system 110 may drive on the sensor electrodes at a one-at-a-time (in any order or sequentially) basis, or concurrently on more than one sensor electrode at the same time. In one embodiment, the concurrent driving can comprise driving coded transmissions such that each of the simultaneously transmitting sensor electrodes transmits a coded transmission that is different from the transmission of any other simultaneous transmission. In another embodiment, the concurrent driving can comprise transmitting with different phases on each transmitting electrode.

Example Methods of Operation

The following discussion sets forth in detail the operation of example methods of operation of embodiments. With reference to FIG. 9 flow diagram 900 illustrates example procedures used by various embodiments. Flow diagram 900 includes some procedures that, in various embodiments, are carried out by a processor such as an ASIC under the control of computer-readable and computer-executable instructions. In this fashion, all or part of flow diagram 900 can implemented using a computer or processing system, such as processing system 110, in various embodiments. The computer-readable and computer-executable instructions can reside in any tangible computer readable storage media, such as, for example, memory and/or logic of or coupled with processing system 110. These computer-readable and computer-executable instructions, are used to control or operate in conjunction with, for example, some portion of processing system 110, such as a processor or ASIC. Although specific procedures are disclosed in flow diagram 900, such procedures are examples. That is, embodiments are well suited to performing various other procedures or variations of the procedures recited in flow diagram 900 and described below. Likewise, in some embodiments, the procedures in flow diagram 900 (along with those described below) may be performed in an order different than presented and/or not all of the procedures described in flow diagram 900 may be performed.

FIG. 9 illustrates a flow diagram 900 of some example methods of position sensing, according to various embodiments. Flow diagram 900 also describes a method of using capacitive imaging sensor device 100 and processing system 110 with one or more of the capacitive imaging sensors 108 that are described herein, according to an embodiment. Procedures of flow diagram 900 are described below, with reference to elements of FIGS. 1-8. The method described by flow diagram 900 is carried out using an image sensor such as sensors 108 (108A-108G) in which sensor electrodes of a first set are disposed substantially in parallel with a first axis and sensor electrodes of a second set are disposed substantially in parallel with the first axis. The sensor electrodes of the first set and second set are disposed in a common single layer on a first surface of a sensor substrate, and at least two sensor electrodes of the first set extend for different lengths along this first axis.

At 910 of flow diagram 900, in one embodiment, a first measurement of capacitive coupling between a first sensor electrode of a first set of sensor electrodes and a sensor electrode of a second set of sensor electrodes is acquired. Processing system 110 accomplishes this, in one embodiment, by transmitting a signal for emission by at least one sensor electrode of the first set and receiving the emitted signal with at least one sensor electrode of the second set. For example, with reference to FIGS. 2A-8, in one embodiment, processing system 110 transmits a signal which is emitted by sensor electrode A2 and received by sensor electrode B0. It is appreciated that processing system 110 may sequentially or simultaneously emit differing signals with adjacent sensor electrodes of the first set. For example, with reference to FIGS. 2A-8, in one embodiment, processing system 110 transmits a positive signal which is emitted by sensor electrode A2 and then sequentially or simultaneously transmits an inverse or negative version of this signal for emission by sensor electrode A1. In one embodiment, each of these positive and negative signals is received by sensor electrode B0 (with respect to FIG. 8, in various embodiments, this may comprise receiving only with B0-*a*, only with B0-*b* or with both B0-*a* and B0-*b* (either sequentially or simultaneously)). It is appreciated that several examples of such measurements are described in conjunction with FIG. 2B and Table 1, and reference is made thereto for further description.

In one embodiment, a first measurement of capacitive coupling between a first sensor electrode of a first set of sensor electrodes and a sensor electrode of a second set of sensor electrodes is acquired by emitting a signal with a sensor electrode of the second set and receiving the emitted signal with at least one sensor electrode of the first set. For example, in one embodiment, processing system 110 may transmit a signal for emission by sensor electrode B0 (with respect to FIG. 8, in various embodiments, this may comprise emitting only with B0-*a*, only with B0-*b* or with both B0-*a* and B0-*b* (either sequentially or simultaneously)) and then receive the emitted signal with, for example, sensor electrode A2.

At 920 of flow diagram 900, in one embodiment, a second measurement of capacitive coupling between a second sensor electrode of the first set of sensor electrodes and the sensor electrode of the second set of sensor electrodes is acquired. Processing system 110 accomplishes this, in one embodiment, by transmitting a signal for emission by a second at least one sensor electrode of the first set and receiving the emitted signal with at least one sensor electrode of the second set. For example, with reference to FIGS. 2A-8, in one embodiment, processing system 110 transmits a signal which is emitted by sensor electrode A1 and received by sensor electrode B0 (with respect to FIG. 8, in various embodiments, this may comprise receiving only with B0-*a*, only with B0-*b* or with both B0-*a* and B0-*b* (either sequentially or simultaneously)). It is appreciated that processing system 110 may sequentially or simultaneously emit differing signals with adjacent sensor electrodes of the first set. For example, with reference to FIGS. 2A-8, in one embodiment, processing system 110 transmits a positive signal which is emitted by sensor electrode A1 and then sequentially or simultaneously transmits an inverse or negative version of this signal for emission by sensor electrode A0. In one embodiment, each of these positive and negative signals is received by sensor electrode B0. It is appreciated that several examples of such measurements are described in conjunction with FIG. 2B and Table 1, and reference is made thereto for further description.

In one embodiment, a second measurement of capacitive coupling between a second sensor electrode of a first set of sensor electrodes and the sensor electrode of a second set of sensor electrodes is acquired by emitting a signal with the sensor electrode of the second set and receiving the emitted signal with at least one sensor electrode of the first set. For example, in one embodiment, processing system 110 may transmit a signal for emission by sensor electrode B0 (with respect to FIG. 8, in various embodiments, this may comprise emitting only with B0-*a*, only with B0-*b* or with both B0-*a* and B0-*b* (either sequentially or simultaneously)) and then receive the emitted signal with, for example, sensor electrode A1

At 930 of flow diagram 900, in one embodiment, a capacitance image is determined using the first and second measurements of capacitive coupling. The capacitance image comprises pixels which are mathematically determined by processing system 110, from measured capacitances. With reference to the measurements described in conjunction with FIG. 2B and Table 1, in one embodiment, processing system 110 utilizes the net measurement from differential drive of adjacent transmitters to determine pixels of the capacitive image. A plurality of pixels can be calculated and combined to produce a capacitive image.

The foregoing descriptions of specific embodiments have been presented for purposes of illustration and description. They are not intended to be exhaustive or to limit the presented technology to the precise forms disclosed, and obviously many modifications and variations are possible in light of the above teaching. The embodiments were chosen and described in order to best explain the principles of the presented technology and its practical application, to thereby enable others skilled in the art to best utilize the presented technology and various embodiments with various modifications as are suited to the particular use contemplated.

What is claimed is:

1. A capacitive imaging sensor device, said device comprising:
   a sensor substrate;
   a first set of sensor electrodes disposed on a first surface of said sensor substrate, wherein sensor electrodes of said first set of sensor electrodes are disposed substantially in parallel with a first axis, and wherein at least two sensor electrodes of said first set of sensor electrodes extend for different lengths along said first axis;
   a second set of sensor electrodes disposed on said first surface, wherein sensor electrodes of said second set of sensor electrodes are disposed substantially in parallel with said first axis, and wherein sensor electrodes of said first set and second set are disposed in a common single layer; and
   a processing system coupled with said first set and said second set of sensor electrodes, said processing system configured for:
      measuring a first capacitive coupling between a first sensor electrode of said first set of sensor electrodes and a sensor electrode of said second set of sensor electrodes;
      measuring a second capacitive coupling between a second sensor electrode of said first set of sensor electrodes and said sensor electrode of said second set of sensor electrodes; and
      determining a capacitance image using said first and second measurements of capacitive coupling.

2. The device of claim 1, wherein sensor electrodes of said first set of sensor electrodes are transmitter sensor electrodes and wherein sensor electrodes of said second set of sensor electrodes are receiver sensor electrodes.

3. The device of claim 1, wherein sensor electrodes of said first set of sensor electrodes are receiver sensor electrodes and wherein sensor electrodes of said second set of sensor electrodes are transmitter sensor electrodes.

4. The device of claim 1, wherein during one time period sensor electrodes of said first set of sensor electrodes are receiver sensor electrodes and sensor electrodes of said second set of sensor electrodes are transmitter sensor electrodes, and during another time period sensor electrodes of said first set of sensor electrodes are transmitter sensor electrodes and sensor electrodes of said second set of sensor electrodes are receiver sensor electrodes.

5. The device of claim 1, wherein a first plurality of sensor electrodes of said first set of sensor electrodes are disposed between two sensor electrodes of said second set of sensor electrodes.

6. The device of claim 5, wherein said first set of sensor electrodes further comprises a second plurality of sensor electrodes, wherein said second plurality of sensor electrodes is disposed in said common single layer, and wherein said second plurality of sensor electrodes is a mirror image of said first plurality of sensor electrodes.

7. The device of claim 5, wherein said first set of sensor electrodes further comprises a second plurality of sensor electrodes, wherein said second plurality of sensor electrodes is disposed in said common single layer, and wherein said second plurality of sensor electrodes is a 180 degree rotation of said first plurality of sensor electrodes.

8. The device of claim 1, wherein said first set of sensor electrodes comprises a first plurality of n sensor electrodes (SE) all of different length, wherein each of said first plurality of SEi sensor electrodes has a substantially proportional length of i+1 sensor electrode pitch units in a direction along said first axis.

9. The device of claim 8, wherein said first plurality of SEi sensor electrodes is arranged on said first surface in order of length.

10. The device of claim 1, wherein at least two sensor electrodes of said second set of sensor electrodes are interdigitated with each other.

11. A capacitive imaging sensor, said sensor comprising:
   a sensor substrate;
   a first set of sensor electrodes disposed on a first surface of said sensor substrate, wherein sensor electrodes of said first set of sensor electrodes are disposed substantially in parallel with a first axis, and wherein at least two sensor electrodes of said first set of sensor electrodes extend for different lengths along said first axis; and
   a second set of sensor electrodes disposed on said first surface, wherein sensor electrodes of said second set of sensor electrodes are disposed substantially in parallel with said first axis, and
   wherein sensor electrodes of said first set and second set are disposed in a common single layer such that a capacitance image relative to said sensor is determinable using a first measurement and a second measurement, wherein said first measurement is of a first capacitive coupling between a first sensor electrode of said first set of sensor electrodes and a sensor electrode of said second set of sensor electrodes, and wherein said second measurement is of a second capacitive coupling between a second sensor electrode of said first set of sensor electrodes and said sensor electrode of said second set of sensor electrodes.

12. The sensor of claim 11, wherein sensor electrodes of said first set of sensor electrodes are transmitter sensor electrodes and wherein sensor electrodes of said second set of sensor electrodes are receiver sensor electrodes.

13. The sensor of claim 11, wherein a first plurality of sensor electrodes of said first set of sensor electrodes are disposed between two sensor electrodes of said second set of sensor electrodes, and wherein said second set of sensor electrodes comprises a plurality of rectangular, bar shaped sensor electrodes which are disposed such that they bracket pluralities of sensor electrodes of said first set of sensor electrodes.

14. The sensor of claim 13, wherein said first set of sensor electrodes further comprises a second plurality of sensor electrodes, wherein said second plurality of sensor electrodes is disposed in said common single layer, and wherein said second plurality of sensor electrodes is a 180 degree rotation of said first plurality of sensor electrodes.

15. The sensor of claim 11, wherein said first set of sensor electrodes comprises a first plurality of n sensor electrodes (SE) all of different length, wherein each of said first plurality of SEi sensor electrodes has a substantially proportional length of i+1 sensor electrode pitch units in a direction along said first axis.

16. The sensor of claim 15, wherein said first plurality of SEi sensor electrodes is arranged on said first surface in order of length.

17. A method of capacitive sensing, said method comprising:
acquiring a first measurement of capacitive coupling between a first sensor electrode of a first set of sensor electrodes and a sensor electrode of a second set of sensor electrodes;
acquiring a second measurement of capacitive coupling between a second sensor electrode of said first set of sensor electrodes and said sensor electrode of said second set of sensor electrodes; and
determining a capacitance image using said first and second measurements of capacitive coupling, wherein sensor electrodes of said first set are disposed substantially in parallel with a first axis and second set are disposed substantially in parallel with said first axis, wherein sensor electrodes of said first set and second set are disposed in a common single layer on a first surface of a sensor substrate, and wherein at least two sensor electrodes of said first set extend for different lengths along said first axis.

18. The method as recited in claim 17, wherein said acquiring a first measurement of capacitive coupling between a first sensor electrode of a first set of sensor electrodes and a sensor electrode of a second set of sensor electrodes comprises:
emitting a signal with at least one sensor electrode of said first set and receiving said signal with a sensor electrode of said second set.

19. The method as recited in claim 18, wherein said emitting a signal with at least one sensor electrode of said first set and receiving said signal with a sensor electrode of said second set comprises:
sequentially emitting differing signals with adjacent sensor electrodes of said first set.

20. The method as recited in claim 17, wherein said acquiring a first measurement of capacitive coupling between a first sensor electrode of a first set of sensor electrodes and a sensor electrode of a second set of sensor electrodes comprises:
emitting a signal with a sensor electrode of said second set and receiving said signal with at least one sensor electrode of said first set.

* * * * *